Aug. 17, 1965  W. AULICH ETAL  3,200,949

SLUDGE FLOCCULATING AND FILTERING APPARATUS

Filed April 4, 1961

INVENTORS:
WILLI AULICH & GEORG PODLICH

By
Burgess, Dinklage & Sprung
ATTORNEYS

United States Patent Office 3,200,949
Patented Aug. 17, 1965

3,200,949
SLUDGE FLOCCULATING AND FILTERING
APPARATUS
Willi Aulich, Buchschlag, and Georg Podlich, Frankfurt am Main, Germany, assignors to Metallgesellschaft Aktiengesellschaft, Frankfurt am Main, Germany, a German corporation
Filed Apr. 4, 1961, Ser. No. 100,569
Claims priority, application Germany, Apr. 8, 1960, M 44,934
3 Claims. (Cl. 210—205)

The present invention relates to a filtering process and apparatus for sludge materials and, more particularly, to such a filtering process and apparatus for flocculating or coagulating a finely divided sludge material or turbid material whereby effective filtration thereof may be carried out in an efficient manner.

It is well known to add flocculating agents to difficultly filterable materials, such as slimy or turbid precipitates or sludges, for the purpose of improving the filterability of such materials. In particular, acid and alkaline decomposition products of clay-containing ores, such as uranium ores, occur in the form of slimy or turbid precipitates or sludges of the fine particle material in the acid or alkaline liquor. Sludge materials, such as those occurring as a result of acid or alkaline decomposition of uranium ores, are often treated not only with flocculating agents but also simultaneously with wetting agents so as to combine the inherent qualities of both these agents in the known manner. Consequently, the sludge material may be more effectively subjected to filtering techniques for the separation of the solids material, i.e., with respect to acid- or alkaline-treated uranium ores for the recovery of the uranium containing liquor.

However, as is well recognized in the art, in order to obtain optimum commercial results in the utilization of such filtering agents as flocculating agents and wetting agents either alone or in combination, not only is a precise dosage metering of these filter agents required as regards quantity, but also the observance of specific procedures and conditions for carrying out the pretreatment before filtering. In this connection, it is most appropriate, for example, not to introduce the total quantity of the filtering agent or agents to be used all at one time into the sludge or turbid material since this will lead to local overconcentration of the filtering agent. Consequently, an excess of the filtering agent will be adsorbed by the sludge without realizing in full its total potential effectiveness. Accordingly, a most common expedient is to add the filtering agent little by little, such as by adding the same in several portions to the sludge or turbid material.

Where the filtration of comparatively thin, fine particle sludge or turbid materials is contemplated, the aforementioned portionwise addition in increments of the filtering agent to the sludge material affords very good results. Nevertheless, where a sludge or turbid material is to be treated which has a tendency towards sedimentation, difficulties occur which are not readily overcome in accordance with the heretofore known procedures. The latter situation arises where coarsely grained particle constituents are present in the solid portion of the sludge material and/or where the solids content of the sludge is comparatively high. If such sludge or turbid material is fed to a filtering device, such as is carried out in the conventional manner by means of an open feeding channel into which the filtering agent is added in portions at various successive points along the extent of the channel, then at comparatively low flow speeds of feeding, sedimentation occurs in the sludge material which defeats the purpose of the feeding channel. On the other hand, if it is possible to increase the flow speed, as for example is the case where the open feeding channel is disposed at a slant or at an angle with respect to the horizontal to such an extent that sedimentation no longer occurs, then the time of stay of the sludge material within the open feeding channel becomes too short to assure a sufficient flocculation of the sludge material before the actual filtering takes place.

If in place of the open feeding channel, a closed feeding pipe is used, sedimentation will again occur at low flow speed while at high flow speed the resulting turbulence of the sludge material passing through the pipe will cause at least partial disintegration of the already formed coagulated flakes or particles of the solids present, in which case the effect of the filtering agent will again be affected detrimentally.

In the ordinary instance, the sludge material to be filtered is passed onto a horizontally disposed endless filtering belt on one side of the filtering zone which causes the suction removal of the liquid portion of the sludge material as the belt conveys the material therethrough, whereupon a suitable filter cake will be discharged from the belt on the other side of the filter zone. While attempts have been made to add the filtering agent or agents at least in part directly to the sludge material already situated on the filtering belt, this has not resulted in a solution of the problem, since the sludge or turbid material at this point cannot become completely flocculated, and at the same time the sludge present on the belt before sufficient contact with the filtering agent will tend to clog the pores of the filtering belt thereat in the very shortest possible time such that subsequent treatment with the filtering agent or flocculating agent cannot undo such clogging. The desire in all the procedures used is to achieve the flocculation of the sludge material evenly and gently prior to disposition of such material onto the filtering belt so as to prevent clogging of the pores of the belt, uneven treatment of such material thereon and consequent inefficient filtering action within the filtering zone.

It is an object of the present invention to overcome the foregoing drawbacks and to provide a process and apparatus for the efficient pretreatment of sludge materials in an even and gentle manner, and for the feeding of such materials so treated onto a filtering device without disturbing the flocculated disposition thereof.

Other and further objects of the invention will become apparent from a study of the within specification and accompanying drawings, in which.

Figure 1:
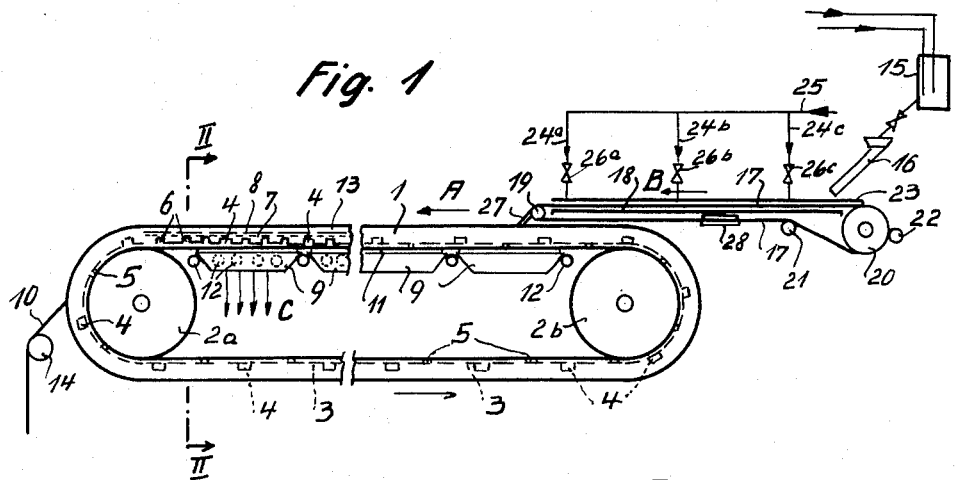
FIGURE 1 is a schematic condensed side view of an arrangement including a filtering agent pretreating apparatus in accordance with the present invention disposed in juxtaposition with respect to a conventional filtering device.
Figure 2:
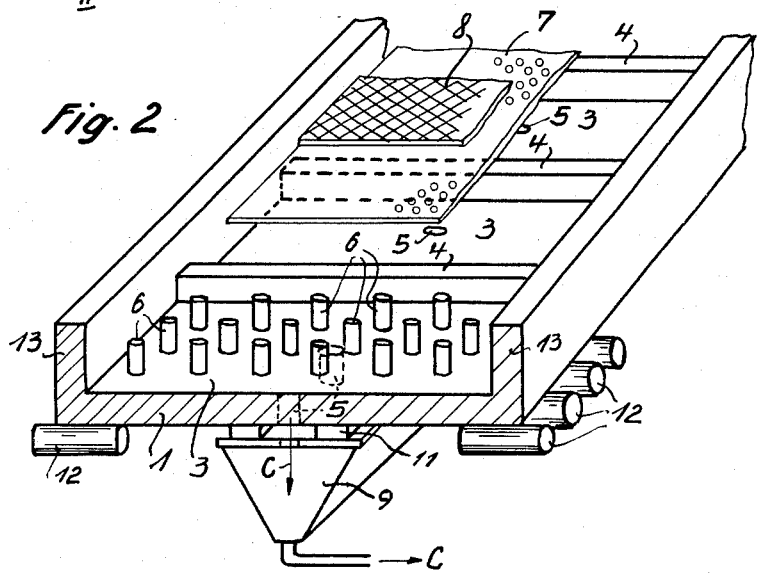
FIGURE 2 is a partial cross section along line II—II of FIGURE 1 in prespectivic view.

It has been found in accordance with the present invention that a filtering apparatus for sludge materials and turbid materials may be provided which comprises means defining a filtering zone, means for conveying sludge material to be filtered along a filter path through the filtering zone whereby sludge material may be filtered therein, and feed means for feeding the sludge material to the conveying means. Specifically, the feed means include a movable elongated liquid-impermeable substantially horizontal feed path terminating adjacent to the path of the conveying means.

Advantageously, a treating liquid dosage means is positioned adjacent to the feed means for supplying treating liquid, such as a filtering agent, i.e., a flocculating agent, in predetermined dosages to sludge material situated on the elongated liquid-impermeable horizontal path of the feed means. As flocculating agents high molecular colloidal solutions are usable, such as solutions of bone glue, high molecular polyacrylonitriles with different functional side groups several of which are readily obtainable e.g. under the trade names of Separan 2016, Superfloc 16 or vegetable products, several of which are obtainable under the trade name Jaguar with different affixes. The invention gives the best results with the modified polyacrylonitriles known under the trade names Superfloc 16 and Separan 2016.

Preferably, a plurality of separate dosage means is provided at spaced intervals along the horizontal feed path, each dosage means being arranged for individually supplying treating liquid to the horizontal feed path transversely thereof. Suitably, each of the dosage means extends transversely with respect to the feed belt for simultaneously supplying flocculating agents along the entire width of the feed belt to the sludge material disposed thereon. Moreover, it is preferred that the filter path and feed path are constructed of the same width such that the material from the feed path may be transferred to the filter path with little disturbance of the sludge material and for maximum utilization of the surface area of the filtering device employed.

For the effective prevention of lateral flow-off of material therefrom, the horizontal feed path of the feed means is provided with lateral retaining means therealong. In the same way, if desired, lateral retaining means may also be provided along the sides of the filter path of the conveying means of the filtering zone.

In accordance with a preferred embodiment of the invention, the feed means includes a liquid-impermeable horizontally disposed elongated feed conveyor belt having a receiving end and a feeding end. Consequently, the receiving end is adapted to receive from a source thereat sludge material to be treated. The filter path of the filtering zone, on the other hand, includes a liquid-permeable filter conveyor belt having an inlet end and a discharge end. The feeding end of the feed conveyor belt is conveniently positioned slightly above and inwardly disposed with respect to the inlet end of the filter conveyor belt. For the gentle and undisturbed flow conveying of filtering agent treated sludge material from the feeding end of the feed conveyor belt to the inlet end of the filter conveyor belt, a slanted slide member is advantageously positioned between said belts.

Thus, a filtering apparatus for flocculating and thereafter for filtering flocculated sludge material is provided in accordance with the invention specifically including a liquid-impermeable elongated horizontally disposed feed conveyor belt having a receiver end and a feeding end, a hopper disposed adjacent to the receiver end of the feed belt for introducing sludge material to be treated onto the feed belt, at least one and preferably a plurality of separate treating liquid dosage means provided at spaced intervals along the feed belt for individually supplying flocculating agents in predetermined dosages to the sludge material introduced onto the feed belt and conveyed thereby, means defining a filtering zone for filtering sludge material therein, including a liquid-permeable elongated, preferably horizontally disposed, filter conveyor belt having an inlet end and a discharge end, said filter conveyor belt being disposed for the same longitudinal direction of movement as the feed belt, the feeding end of the feed belt being positioned slightly above the filter belt and inwardly displaced with respect to the outermost portion of the inlet end, and an inclined member positioned for flow conveying sludge material from the discharge end of the feed belt to the inlet end of the filter belt.

More specifically, with respect to the process of the present invention, the same relates to the filtering of sludge material by passing the sludge material along the filter path and subjecting the material to suction filtering during this time. The sludge material, however, is first passed along an elongated horizontally moving liquid-impermeable pretreatment path during which time liquid flocculating agent is separately supplied thereto in predetermined dosages at spaced intervals along the pretreatment path. As a result, the amount of flocculating agent added is increased in increments during travel of the sludge material along the pretreatment path. Thereafter, the flocculating agent enriched material is gently transferred from the pretreatment path to the filter path for filtering thereon. By means of the gentle transferring, the flakes formed by the liquid flocculating agent are not substantially damaged so that the pores or apertures present in the filter belt defining the filter path will not be clogged.

Suitably, the liquid flocculating agent is supplied transversely over the extent of the width of the pretreatment path, and a wetting agent may be additionally supplied with the flocculating agent as desired. Due to the supplying of the flocculating agent and wetting agent in increments along the course of travel of the sludge material, such material is completely pretreated or supplied with a minimum quantity of filtering agents by the time the same reaches the point where it is transferred on to the filter path. In this connection, it will be appreciated that an economy of utilization of the complete, effective surface of the filtering path will be permitted for the filtration of the sludge material since the filtering path is only provided with already treated sludge or turbid material. In this manner, a clogging of the filter pores of the belt defining the filter path will not occur since all of the constituent portions of the sludge material will have been suitably and sufficiently flocculated by the filtering agent pretreatment to prevent oozing of the material into such pores.

The sludge material, which may be any turbid material such as a suspension of an acid-treated or alkaline-treated clay-containing ore, is a coarse particle material which may have particles of a size up to 3 mm. particle magnitude. Sludges having high solids content, i.e. 50% per weight and more, may be used in this connection, even where the same are extremely viscous in consistency and just able to be stirred.

Referring to the drawings the filter consists basically of an endless rubber belt 1 running over two end drums 2a and 2b, the foremost drum 2a being the drive drum, for movement in the direction of the arrow A. The belt is divided into individual suction cells 3 by cross bars 4, each cell having a central discharge opening 5. Within each cell, supporting rods 6 are arranged for supporting a second endless perforated rubber belt 7. This perforated rubber belt lies on the cross bars 4 and the supporting rods 6. It supports in turn the filter cloth 8. As the filter cloth 8 is not fixed to the second rubber belt 7 which supports it, it can be washed continuously.

As the discharge openings 5 pass over the suction boxes or traps 9, wherein the suction direction is indicated by the arrows C, suction filtering of sludge material 10 disposed on filter cloth 8 will be achieved in an efficient manner.

Suitably an airtight seal between filter belt 1 and suction box 9 is provided by relatively narrow rubber strips 11, travelling in the same direction as the actual filter belt. The filter belt 1 is supported along its path on rollers 12. The filter belt is provided with lateral retaining walls 13 adjacent to the side edges of belt 1. By reason of the filtering action whereby the liquids portion is removed from the belt 1 via aperture 5 and collected in the traps 9, a filter cake 10 substantially free from moisture peels off the belt 1 at the drum 2a. The peeled-off filter cake 10 is guided onto a take-off roller 14 adjacent to the drum 2a, such that a continuous band of filter cake 10 will be formed by the filtering action.

In accordance with the invention, the sludge or turbid material to be filtered is initially fed from container 15 through the chute 16 onto the feed conveyor belt 17 which travels in the direction of arrow B. Feed conveyor belt 17 is maintained in horizontal disposition e.g. by a metal sheet 18 with upturned side edges (not shown in the drawing) to provide a lateral enclosure for the sludge and driven by means of the drive rollers 19 and 20 upon which the belt 17 is mounted for endless rotational movement. The feed conveyor belt 17 is impermeable to liquids and the same is maintained in elongated horizontal disposition by means of the tension guide roller 21 which keeps belt 17 in taut condition. An additional roller 22 presses the belt 17 onto roller 20 to prevent slipping. Belt 17 may also be suitably provided with lateral retaining walls, in this case shown at 23, similar in construction to the walls which may be provided for belt 1. Arranged above the upper path of movement of feed conveyor belt 17 are spaced apart separate dosage elements 24a, 24b and 24c connected to a main source 25. A flocculating agent may, therefore, be supplied to sludge material traveling along belt 17 in increments so as to increase little by little the amount of flocculating agent added whereby the desired complete amount of flocculating agent will have been supplied by the time the sludge material reaches the roller 19. Suitable valves 26a, 26b and 26c are provided for independently metering the flocculating agent to the belt 17 at the elements 24a, 24b and 24c. The flocculating agent, of course, will be supplied along a line transverse the direction of movement of belt 17 extending across the entire width of belt 17. This may be accomplished by providing a plurality of adjacent dosage elements 24a in a transverse line extending across the width of belt 17 and, in turn, providing a similar plurality of dosage elements 24b and 24c in separate lines extending across the width of belt 17 at the indicated spaced apart longitudinal intervals. At this point, because of the juxtaposed relationship between the discharge end of belt 17 at roller 19 and the inlet end of the filter belt 1 at roller 2b, the sludge material may be gently transferred from the feed belt 17 to the filter belt 1. Belts 1 and 17 are both preferably horizontally disposed and belt 17 is conveniently immediately above belt 1 so that a minimum distance of movement will be involved in transferring sludge material from belt 17 to belt 1 therebelow. Preferably a scraper 28 may be provided which cleans the backside of belt 17 from adhering sludge on its return way. Of course, both belts 1 and 17 are preferably of the same width so that efficient transfer and complete utilization of all effective belt surface area will be attained. Furthermore, a slanted slide member or incline member 27 extends from the discharge end of belt 17 adjacent to roller 19 outwardly and downwardly to the top surface of belt 1 arranged immediately therebelow. Such slide member or incline member serves to effect the gentle transferring of the flocculating agent enriched sludge material from the pretreatment path defined by feed belt 17 to the filter path defined by filter belt 1 without substantially damaging the flakes formed by the action of the flocculating agent. Of course, slide member 27 is preferably provided with the same width as the belts 1 and 17.

The following examples are set forth for the purpose of further illustrating the invention, and it is to be understood that the same are not to be considered as limiting the invention thereto.

In these, Examples 1 to 3 describe several attempts to obtain satisfactory filtering according to known procedures and alterations thereof, whereas Example 4 describes the results achieved according to the instant invention.

*Example 1.*—Prior art 2 tons per hour of a uraniferous prophyr, strongly weathered and consequently rich in clay, were broken up to <15 mm. in a percussion crusher and wet-ground in a rod mill. The rock had the following mean analysis:

| | Percent | | Percent |
|---|---|---|---|
| $SiO_2$ | 74 | MgO | 0.5 |
| $Al_2O_3$ | 12 | $K_2O$ | 9.0 |
| $Fe_2O_3$ | 2.5 | $Na_2O$ | |
| CaO | 1.5 | $U_3O_8$ | 0.1 |

The uranium was present chiefly in the form of zeunerite, $$Cu(UO_2)_2(AsO_4)_2 \cdot 8-12H_2O$$

The screen analysis of the crushed material gave the following values:

| | Percent |
|---|---|
| >3 mm. | 0.1 |
| 3–1 mm. | 11.6 |
| 1–0.5 mm. | 20.1 |
| 0.5–0.2 mm. | 21.4 |
| 0.2–0.1 mm. | 13.1 |
| 0.1–0.06 mm. | 8.7 |
| 0.06–0.037 mm. | 6.1 |
| <0.037 mm. | 18.9 |
| | 100.0 |

The ore sludge was subsequently leached in a series of agitator tanks arranged in cascade fashion and connected with overflows. The average dwell in the leaching plant amounted to 4 hours. In the first leaching tank 90 kgs. $H_2SO_4$ per hour were added in the form of 72% acid. In the 3rd and 4th leaching tanks the temperature was raised to 60° C. by introducing steam. The density of the sludge composed of leached ore and uranium salt solution was, on entering the leaching plant 1530 grams per litre, which, in the case of rock having a specific density of 2.7 g./ml., corresponds to a content of solid substance amounting to 64%. In a 5th agitator tank connected up following the leaching plant, a portion of the excess acid was neutralized by the addition of lime milk (15g. $Ca(OH)_2$/l.) and a pH value of 1.5 produced. The density of the sludge composed of leached ore and uranium salt solution was, at the overflow of this tank, about 1500 g./l, corresponding to a solid content of 53%.

The sludge passed out from the overflow of the 5th agitator tank onto a smooth open gutter 4 m. in length and 60 cm. in width with an incline of 10% and thence over the chute 27 onto the above-described band filter. The gutter served, in accordance with the recommendation of the manufacturers of the flocculating medium Separan, for introducing the flocculating medium solution. The solution was fed onto the sludge flowing in the gutter by means of a dosing pump through three spraying tubes reaching across the entire width of the gutter and arranged at a distance of 1.5 m. apart about 20 cm. above the gutter. The concentration of the flocculating medium solution was adjusted to 0.04%. The quantity of flocculating medium solution amounted to 625 l/hr., which corresponded to a consumption of flocculating medium of 125 g./t. solid.

The filter employed had a filter cloth width of 1 m. and a suction surface length of 8 m. so that a filter area of 8 m.² was available. The speed of the band was set at about 1 m./hr., so that a filter cake slightly more than 20 mm. thick (measured at the discharge end of the filter) was produced.

The apparatus operated satisfactorily for about ½ hour, the flocculation being complete. The filter cake, after passing over 1 to 2 m. of the suction surface, was free from supernatant liquid. Gradually, however, the flocculation gutter became clogged by settling coarse particles. The settled solid accumulated progressively, the sludge ran in irregularly shaped and branched streams, sometimes with a high flow velocity, between the deposited solids. At the same time the flocculation continually became worse so that the filter cloth finally became completely clogged. Cleaning the gutter by hand only resulted in temporary improvement. The filter output dropped sharply as the flocculation deteriorated. Finally, in spite of increasing the speed of the band to 1.3 m./min., the whole filter became flooded so that the experiment had to be interrupted after a total period of about 80 minutes.

*Example 2.*—Modification of the prior art

The ore sludge to be filtered was the same as in the 1st example. The method and the equipment up to the overflow from the 5th agitator tank remained unchanged, likewise the band filter. The velocity of the filter band was again set at 1 m./min. To prevent the sedimentation of coarse particles in the flocculation gutter, this was, however, set at a steeper angle, the gradient now being about 25%.

With this apparatus complete flocculation could not be attained. The flocculation gutter certainly remained free from sedimented solids but the flow velocity of the sludge through the flocculation gutter was so high that the flocculating medium could not become fully effective and unflocculated fine portions of the sludge always reached the filter cloth. Even increasing the quantity of flocculating medium to about 1.5 m.$^3$/hr. (300 g./t.) did not result in complete flocculation. It was certainly possible by using the entire filter surface for a period of about 45 minutes, to produce a sufficiently dry filter cake (<30% $H_2O$) but after a complete circulation of the filter cloth the output dropped so sharply that also in this case the whole filter became flooded.

*Example 3.*—Another modification of the prior art

The ore sludge to be filtered was the same as in the 1st example. The method and the equipment up to the overflow of the sludge from the 5th agitator tank remained unchanged, likewise the band filter. The velocity of the filter band was again set at 1 m./min. The flocculation gutter had a gradient of about 25%. The flocculating medium was not, however, fed over the gutter by three distributing devices as in the 1st and 2nd examples, but was introduced already in the receiver tank so as to thereby increase the dwell between the adding of the flocculating medium and the running of the sludge on to the filter cloth.

This method was carried out from the outset with a quantity of flocculating medium solution amounting to 1 m.$^3$/hr. without, however the flocculation being complete. Only by further increasing the addition of flocculating medium to about 1.6 m.$^3$/hr. (320 g./t.) was the flocculation so good that a filter area of only about 2 m.$^2$ could again be used to suck off the supernatant liquid through the sedimented filter cake. Apparently the flakes formed were considerably damaged in the flowing out of the solution from the receiver tank and consequently the utilization of the flocculating medium was considerably impaired.

*Example 4.*—Present invention

The ore sludge to be filtered was the same as in the 1st example. The method and the apparatus up to the overflow of the sludge from the 5th agitator tank remained unchanged, likewise the band filter. The speed of the filter band was again set at 1 m./min. The flocculation band 17 and the appropriate delivery devices 24a, 24b, 24c for the flocculating medium solution were used for the flocculation. The delivery devices consisted of three spraying tubes 90 cm. in length, provided on their underside with bores 1 cm. apart and arranged transversely across the flocculation band at distances of 1.5 m. apart. About 210 litres of solution per hour flowed out of each of these spraying tubes on to the sludge to be flocculated. The total quantity of flocculating medium solution therefore amounted to only 630 l./hr. (125 g. solid flocculating medium per ton of ore), that is 39% of that required according to the 3rd example, which was the only usable modification of the known state of the art. The band was 4 m. in length and 90 cm. wide. The speed of travel of the flocculation band amounted to 7 m./min. Thus with an ore throughput of 2 t./hr. and a quantity of sludge amounting to 3.15 m.$^3$/hr. (including 0.63 m.$^3$ of flocculating medium solution per hour) a layer thickness of about 8 mm. of sludge was produced on the flocculation band. It was found that after the first addition of flocculating medium the greater part of the fine material was flocculated. Before reaching the second feed point the flakes had settled on the band so that the flocculating medium solution came chiefly into contact only with the supernatant sludge and consequently with the remaining fine material which had not settled. Between the second and third delivery tubes the flakes formed again sank so that at the third delivery point the last residues of unflocculated fine particles could be flocculated out. From the end of the flocculation, band 17, which was located about 15 cm. above the filter band 1, the flakes passed gently onto the fiter cloth 8 over a chute 27 arranged at a gradient of about 45° and bearing against the flocculation band at the reversing pulley 19.

The effect of this arrangement was so good that even in continuous operation, the liquid was completely sucked off at a distance of about 1 to 2 m. from the discharge point. The remaining 6 to 7 m. of the length of the filter could thus be used for washing and sucking dry the filter cake. The filter cake delivered at the discharge point of the filter had a residual moisture of about 22%.

What is claimed is:

1. Filtering apparatus for flocculating and thereafter filtering flocculated sludge material which comprises a liquid-impermeable elongated substantially horizontally disposed feed conveyor belt having a receiving end and a feeding end, a hopper being disposed adjacent to the receiving end of the feed belt for introducing sludge material to be treated onto said feed belt, a plurality of separate treating liquid dosage means being provided at spaced intervals along said feed belt for individually supplying flocculating agents in predetermined dosages to the sludge material introduced onto said feed belt and being conveyed thereby, means defining a filtering zone for filtering sludge material therein, including a liquid-permeable elongated horizontally disposed filter conveyor belt having an inlet end and a discharge end being disposed for the same longitudinal direction of movement as said feed belt, the feeding end of said feed belt being positioned slightly above said filter belt and inwardly displaced with respect to the outermost portion of said inlet end, and an incline member positioned for flow conveying sludge material from the feeding end of said feed belt to the inlet end of said filter belt.

2. Apparatus according to claim 1 wherein each said dosage means extends transversely of said feed belt for simultaneously supplying flocculating agents along the width of said feed belt to the sludge material.

3. Apparatus according to claim 2 wherein both said belts are of the same width and are provided with lateral liquid-impermeable retaining means for preventing the premature lateral flow-off of sludge material and treating agents.

References Cited by the Examiner

UNITED STATES PATENTS

| | | | |
|---|---|---|---|
| 1,956,420 | 4/34 | Gleason et al. | 210—53 X |
| 2,094,909 | 10/37 | Baily et al. | 210—199 |
| 2,308,264 | 1/43 | Bolton | 210—199 |
| 2,481,110 | 9/49 | Greenawalt | 210—77 |
| 2,988,504 | 6/61 | Mazurek | 210—53 |
| 3,009,873 | 11/61 | Kerr et al. | 210—53 |
| 3,087,890 | 4/63 | Pye | 210—54 X |

MORRIS O. WOLK, *Primary Examiner.*

CHARLES F. KRAFFT, *Examiner.*